United States Patent [19]

Whittam

[11] Patent Number: 4,743,437
[45] Date of Patent: May 10, 1988

[54] ZEOLITE NU-13 AND PROCESS FOR ITS PREPARATION USING PIPERAZINE COMPOUNDS

[75] Inventor: Thomas V. Whittam, Darlington, England

[73] Assignee: Imperial Chemical Industries PLC, London, England

[21] Appl. No.: 640,783

[22] Filed: Aug. 14, 1984

Related U.S. Application Data

[63] Continuation of Ser. No. 351,489, Feb. 23, 1982, abandoned.

[30] Foreign Application Priority Data

Feb. 23, 1981 [GB] United Kingdom ............... 8105654

[51] Int. Cl.$^4$ ................... C01B 35/10; C01B 33/28; B01J 29/28
[52] U.S. Cl. ................... 423/277; 423/326; 423/328; 423/329; 502/60; 502/62; 502/77; 502/202
[58] Field of Search .............. 423/277, 326–333; 502/62, 77

[56] References Cited

U.S. PATENT DOCUMENTS 3,832,449 8/1974 Rosinski et al. ............... 423/328
4,397,827 8/1983 Chu ................... 423/326
4,423,021 12/1983 Rollmann et al. ............... 423/333

FOREIGN PATENT DOCUMENTS 0013630 7/1980 European Pat. Off. .
0015132 9/1980 European Pat. Off. .
0018089 10/1980 European Pat. Off. .

OTHER PUBLICATIONS

R. B. LaPierre et al, "The Framework Topology of ZSM-12: A High Silica Zeolite", Zeolites, vol. 5, No. 6, Nov. 1985, pp. 346–348.
A. Araya et al, "Synthesis and Characterization of Zeolite Nu-10", Zeolites, vol. 4, No. 3, Jul. 1984, pp. 280–286.
J. L. Schlenker et al, "The Framework Topology of ZSM-48: A High Silica Zeolite", Zeolites, vol. 5, No. 6, Nov. 1985, pp. 355–358.

Primary Examiner—John Doll
Assistant Examiner—Jackson Leeds
Attorney, Agent, or Firm—Cushman, Darby & Cushman

[57] ABSTRACT

A synthetic zeolite material, designated zeolite Nu-13, is a member of the ZSM-12 family of zeolites and is prepared from an aqueous reaction mixture containing the oxide $XO_2$, the oxide $Y_2O_3$ and a piperazine compound where X is silicon or germanium and Y is aluminium, gallium, boron, iron, chromium, vanadium, molybdenum, arsenic, antimony or manganese.

12 Claims, No Drawings

ZEOLITE NU-13 AND PROCESS FOR ITS PREPARATION USING PIPERAZINE COMPOUNDS

This is a continuation of application Ser. No. 351,489, filed Feb. 23, 1982, now abandoned.

This invention relates to a new zeolite material hereinafter referred to as zeolite Nu-13 and to a method for its preparation, the new zeolite being a member of the ZSM-12 family of zeolites.

Zeolite ZSM-12 and methods for its preparation have been described in U.S. Pat. Nos. 3,832,449 and 4,104,294 and in published European Patent Application Nos. 1089 and 13630. In all of the methods described, an essential feature of the synthesis of ZSM-12 is the use of an expensive tetra-alkylammonium compound.

It has now surprisingly been found that zeolite Nu-13, a new member of the ZSM-12 family of zeolites, may be prepared using a much lower cost organic starting material than the tetra-alkylammonium compounds, namely piperazine or a derivative thereof.

Accordingly, the invention provides a synthetic zeolite material, designated zeolite Nu-13, having a molar composition expressed by the formula:

0 to $4M_2O$:0.1 to $2.5Y_2O_3$:$100XO_2$:0 to $35H_2O$ wherein M is sodium, ammonium or hydrogen, Y is one or more of aluminium, gallium, boron, iron, chromium, vanadium, molybdenum, arsenic, antimony and manganese, X is silicon and/or germanium and $H_2O$ is water of hydration additional to water notionally present when M is hydrogen, and having an X-ray diffraction pattern (as determined by standard technique using copper $K\alpha$ radiation) substantially as set out in Table 1.

For comparison, Table 1 also shows the X-ray data for zeolite ZSM-12 as given in Table 1 of U.S. Pat. No. 3,832,449.

Zeolite Nu-13 appears to be most readily formed in a state of high purity when the number of moles of $Y_2O_3$ in the above formula is in the range 0.5 to 1.7.

The above definition includes both freshly prepared zeolite Nu-13 ("freshly prepared" means the product of synthesis and washing, with optional drying, as hereinafter described) and also forms of it resulting from dehydration and/or calcination and/or ion exchange.

Freshly prepared zeolite Nu-13 may contain a piperazine compound used in its synthesis. Since the product is a zeolite, the piperazine compound must be physically trapped within the crystal lattice. It can be removed by thermal or oxidative degradation or by displacement by suitable small molecules. This physically trapped material does not constitute part of the composition for the purposes of the definition. Thus, zeolite Nu-13 as freshly made typically has the following molar composition:

0 to $4M_2O$:0.1 to Q:0.1 to $2.5Y_2O_3$:$100XO_2$:0 to $35H_2O$ wherein Q represents the piperazine compound.

The $H_2O$ content of freshly prepared zeolite Nu-13 depends on the conditions in which it has been dried after synthesis.

Calcined forms of the zeolite may contain any inorganic cation including hydrogen since the organic component is burnt out in the presence of air or otherwise displaced prior to calcination leaving hydrogen as the other balancing cation.

TABLE 1

X-RAY DATA FOR Nu-13 AND ZSM-12

| ZEOLITE Nu-13 (Example 1) | | ZSM-12 (from TABLE 1 U.S. Pat. No. 3832449) | |
|---|---|---|---|
| dA | 100 $I/I_o$ | dA | I |
| 11.8 | 19 | 11.9 | Medium |
| 10.05 | 9 | 10.1 | Medium |
| 4.79 | 16 | 4.76 | Weak |
| 4.26 | 100 | 4.29 | Very Strong |
| 4.08 | 46 | 3.98 | Medium |
| 3.88 | 30 | 3.87 | Very Strong |
| 3.834 | 23 | — | — |
| 3.648 | 3 | — | — |
| 3.541 | 10 | 3.49 | Weak |
| 3.466 | 15 | — | — |
| 3.395 | 11 | 3.38 | Medium |
| 3.320 | 12 | — | — |
| 3.198 | 6 | 3.20 | Weak |
| 3.143 | 6 | — | — |
| 3.043 | 5 | 3.05 | Weak |
| 2.894 | 8 | — | — |
| 2.515 | 12 | 2.54 | Medium |
| 2.495 | 13 | — | — |

Among the ion-exchanged forms of zeolite Nu-13, the ammonium ($NH_4^+$) is of importance since it can be readily converted to the hydrogen form by calcination. The hydrogen form can also be prepared directly by exchange with an acid. The hydrogen form and forms containing metals introduced by ion exchange are described further below.

The invention also provides a method of making zeolite Nu-13 which comprises reacting an aqueous mixture comprising at least one oxide $XO_2$, at least one oxide $Y_2O_3$, and at least one piperazine compound.

The reaction mixture preferably has the following molar composition:

$XO_2/Y_2O_3$: 40 to 1000, preferably 70 to 200
$MOH/XO_2$: $10^{-3}$ to 0.4, preferably 0.02 to 0.15
$Q/XO_2$: 0.01 to 5, preferably 0.05 to 2
$H_2O/XO_2$: 10 to 100, preferably 25 to 50
$MZ/XO_2$: 0.1 to 10, preferably 0.3 to 3 wherein X and Y have the meanings given above, Q is a piperazine compound, M in MOH is sodium or ammonium, M in MZ is sodium, ammonium or hydrogen and Z is a strong acid radical present as a salt of M and may be added as a free acid to reduce the MOH level to a desired value.

The Examples show that by using reaction mixtures having compositions outside the preferred ranges, the desired product may be contaminated with other zeolites such as near ferrierites and/or ZSM-5 type zeolites.

The piperazine compound can be partially or fully alkylated e.g. methylated, but the preferred piperazine compound is piperazine itself.

The preferred alkali metal (M) is sodium. The preferred oxide $XO_2$ is silica ($SiO_2$), the preferred oxide $Y_2O_3$ is alumina ($Al_2O_3$) and the preferred acid radical is chloride.

The silica source can be any of those commonly considered for use in synthesising zeolites, for example powdered solid silica, silicic acid, colloidal silica or dissolved silica. Among the powdered silicas usable are precipitated silicas, especially those made by precipitation from an alkali metal silicate solution, such as the type known as "KS 300" made by AKZO, and similar products, aerosil silicas, fume silicas and silica gels suitably in grades for use in reinforcing pigments for rubber or silicone rubber. Colloidal silicas of various particle sizes may be used, for example 10–15 or 40–50 microns, as sold under the Registered Trade Marks "LUDOX" "NALCOAG" and "SYTON". The usable dissolved silicas include commercially available waterglass silicates containing 0.5 to 6.0, especially 2.0 to 4.0 mols of $SiO_2$ per mole of alkali metal oxide, "active" alkali metal silicates as defined in UK Patent No. 1193254, and silicates made by dissolving silica in an alkali metal hydroxide or a quaternary ammonium hydroxide or a mixture thereof.

The alumina source is most conveniently sodium aluminate, but can be or can include aluminium, an aluminium salt for example the chloride, nitrate or sulphate, an aluminum alkoxide or alumina itself, which should preferably be in a hydrated or hydratable form such as colloidal alumina, pseudobeohmite, boehmite, gamma alumina or the alpha or beta trihydrate.

The reaction mixture is reacted usually under autogeneous pressure, optionally with added gas, e.g. nitrogen at a temperature between 85° and 250° C. until crystals of zeolite Nu-13 form, which can be from one hour to many months depending on the reactant composition and the operating temperature. Agitation is optional, but is preferable since it reduces the reaction time.

At the end of the reaction, the solid phase is collected on a filter and washed and is then ready for further steps such as drying, dehydration and ion-exchange.

If the product of the reaction contains alkai metal ions, these have to be at least partly removed in order to prepare the hydrogen form of zeolite Nu-13 and this can be done by ion exchange with an acid, especially a strong mineral acid such as hydrochloric acid or by way of the ammonium compound, made by ion exchange with a solution of an ammonium salt such as ammonium chloride. Such ion exchange can be carried out by slurrying once or several times with the solution.

In general, the cation(s) of this zeolite can be replaced by any cation(s) of metals, and particularly those in Groups IA, IB, IIA, IIB, III (including rare earths) VIII (including noble metals) and by lead, tin and bismuth. (The Periodic Table is as in "Abridgements of Specifications" published by the UK Patent Office.) Exchange is carried out using any water soluble salts containing the appropriate cation.

In order to prepare a catalyst, zeolite Nu-13 may be used in association with an inorganic matrix, or with other materials which can be either inert or catalytically active. The matrix may be present simply as a binding agent to hold the small zeolite particles (0.005 to 10 microns) together, or it may be added as a diluent to control the amount of conversion in a process which may otherwise proceed at too high a rate, leading to catalyst fouling as a result of excessive coke formation. Typical inorganic diluents include catalyst support materials such as alumia, silica, kaolinic clays, bentonites, montmorillonites, sepiolite, attapulgite, Fullers earth, synthetic porous materials such as $SiO_2$-$Al_2O_3$, $SiO_2$-$ZrO_2$, $SiO_2$-$ThO_2$, $SiO_2$-$BeO$, $SiO_2$-$TiO_2$ or any combination of these oxides. An effective way of mixing zeolite Nu-5 with such diluents is to mix appropriate aqueous slurries in a mixing nozzle and then to spray-dry the slurry. Other ways of mixing can be used.

If zeolite Nu-13 in any cationic form or as a catalytic composite is exchanged or impregnated with hydrogenation/dehydrogenation components, such as Ni, Co, Pt, Pd, Re, Rh, hydrocracking and reforming catalysts can be made, especially if the $Na_2O$ content is less than 0.1% w/w.

A wide range of hydrocarbon conversion catalysts can be prepared from zeolite Nu-13 by ion exchange or impregnation with cations, or oxides, selected from the following Cu, Ag, Mg, Ca, Sr, Zn, Cd, B, Al, Sn, Pb, V, P, Sb, Cr, Mo, W, Mn, Re, Fe, Co, Ni noble metals and lanthanides.

Usually the zeolite catalyst will be in acid form, thus stoichiometry is maintained by $H^+$ or $H_3O^+$ as an additional balancing cation, or as sole cation. Such catalysts may find application in the following processes; catalytic cracking, hydrodesulphurization, hydrodenitrification, catalytic dewaxing, alkylation of alkanes or aromatics, dealkylation, disproportionation, isomerisation or alkanes and alkyl benzenes, dehydration reactions, oxidation, polymerisation and conversion of methanol to hydrocarbons.

The invention is illustrated by the following Examples.

EXAMPLE 1

The synthesis mixture had the following molar composition: $2.32Na_2O$, 92.7 piperazine, $Al_2O_3$, $96.3SiO_2$, $3371H_2O$, $54.8NaCl$. 57.2 g piperazine were dissolved in 200 g water and 142 g colloidal silica (Syton X-30, molar composition $Na_2O$, $0.0395Al_2O_3$, $85.6SiO_2$, $689H_2O$) were stirred in to give Solution A.

Next, 1.6 g sodium aluminate (of molar composition $1.25Na_2O$, $Al_2O_3$, $3H_2O$) were dissolved in 10 g water and stirred into Solution A.

Finally, 23 g sodium chloride were dissolved in 125 g water and stirred into the aluminate/silica slurry. The mixture was reacted at 177° C. for 3 days in a stainless steel autoclave. After cooling to about 60° C., the slurry was filtered, and washed with two liters of distilled water at about 60° C., and dried overnight at 120° C. The product was sodium piperazine Nu-13 having the molar composition:

$0.2Na_2O$, 1.8 Q, $Al_2O_3$, $90SiO_2$, $15H_2O$ and X-ray data as shown in Table 1. This data is compared with data for ZSM-12 and it is evident that while the product of this invention shows broad similarities to ZSM-12 there are significant differences.

EXAMPLE 2

A portion of the product of Example 1 was calcined in moist air at 550° C. for 17 hours, and then twice exchanged with 5 ml per g of normal HCl for 1 hours at 60° C. The product was filtered and washed with 10 ml per g distilled water, dried for 17 hours at 120° C., and calcined in air at 450° C. for 3 hours and had substantially the X-ray diffraction data shown in Table 2 and the following molar composition:

$0.02Na_2O$, $Al_2O_3$, $89.7SiO_2$.

EXAMPLE 3

The reaction mixture had the following molar composition:

300 piperazine, $12Na_2O$, $Al_2O_3$, $500SiO_2$, $13000H_2O$, $280NaCl$.

71 g piperazine were dissolved in 150 g water and 312 g colloidal silica ($Na_2O$, $0.032Al_2O_3$, $76SiO_2$, $666H_2O$) to give solution A. Next, 1.9 g sodium hydroxide and 0.5 g sodium aluminate ($1.22Na_2O$, $Al_2O_3$, $1.2H_2O$) were dissolved in 10 g water, and then stirred into solution A. Finally, 45 g sodium chloride were dissolved in 267 g water and stirred into the mixture, which was then reacted at 180° C. for 5 days in a stirred 1 liter stainless steel autoclave. The product contained about 40% zeolite Nu-13 with approximately equal amounts of α-quartz and α-cristobalite.

TABLE 2

X-RAY DATA FOR CALCINED H—Nu-13 (Example 2)

| dA | 100 $I/I_o$ |
|---|---|
| 11.8 | 22 |
| 9.83 | 7 |
| 4.72 | 12 |
| 4.65 | 8 |
| 4.422 | 7 |
| 4.243 | 100 |
| 4.065 | 73 |
| 3.965 | 26 |
| 3.850 | 40 |
| 3.800 | 33 |
| 3.633 | 8 |
| 3.534 | 15 |
| 3.453 | 19 |
| 3.376 | 15 |
| 3.255 | 6 |
| 3.181 | 7 |
| 3.132 | 6 |
| 3.038 | 5 |
| 2.894 | 10 |
| 2.508 | 16 |
| 2.488 | 15 |
| 2.023 | 6 |

EXAMPLE 4

The reaction mixture had the following molar composition:

22 piperazine, $5.87Na_2O$, $Al_2O_3$, $56SiO_2$, $2153H_2O$, 33.7NaCl.

35 g piperazine were dissolved in 330 g water and 233 g of colloidal silica (composition as Example 3) to give solution A. Next, 6.2 g sodium hydroxide and 3.7 g sodium aluminate were dissolved in 38 g water, and then stirred into solution A. Finally, 37.5 g sodium chloride in 200 g water was stirred in and the mixture was reacted for 2 days at 180° C. in a stirred stainless steel autoclave. The product contained about 35% zeolite Nu-13, about 35% near ferrierite and approximately equal amounts of α-quartz and α-cristobalite.

EXAMPLE 5

The reaction mixture had the following molar composition:

77 piperazine, $2Na_2O$, $Al_2O_3$, $80SiO_2$, $3000H_2O$, 46NaCl.

73.6 g piperazine were dissolved in 240 g water and 192 g of Q-79 water glass ($400Na_2O$, $Al_2O_3$, $1280SiO_2$, $9,720H_2O$) to give solution A. Next, 2.5 g aluminium chloride ($AlCl_3$ $6H_2O$) were dissolved in 240 ml of 2N hydrochloric acid. The acid solution was stirred into solution A to give an homogenous mixture, which was reacted for 3 days at 180° C. in a stainless steel autoclave. The product was zeolite Nu-13 containing approximately 10% near ferrierite.

EXAMPLE 6

The reaction mixture had the following molar composition:

80 piperazine, $2.2Na_2O$, $Al_2O_3$, $78.2SiO_2$, $3079H_2O$, 47.3NaCl.

57.2 g piperazine were dissolved in 223 g water and 142 g colloidal silica ($Na_2O$, $0.032Al_2O_3$, $76SiO_2$, $666H_2O$) to give solution A.

Next, 1.6 g sodium aluminate ($1.22Na_2O$, $Al_2O_3$, $1.2H_2O$) were dissolved in 10 g water and stirred into Solution A. Finally, 23 g sodium chloride were dissolved in 125 g water and stirred into the slurry. The mixture was reacted 3 days at 180° C. The product after 12 hours was zeolite Nu-13 with a trace of α-quartz but after 24 hours the Nu-13 was contaminated by about 30% α-quartz.

EXAMPLE 7

This Example was a repeat of Example 6 except that 4.2 g sodium hydroxide was added to the sodium aluminate solution i.e. this example was run at $OH^-/SiO_2=0.22$, whereas in Example 6, the $OH^-/SiO_2$ was 0.057. The mixture was reacted at 180° C. Even after 8 hours, the product was 70% α-quartz and only 30% Nu-13. This Example demonstrates the fact that the $OH/SiO_2$ ratio is a critical factor in the synthesis of zeolite Nu-13.

EXAMPLE 8

This Example was a repeat of Example 1 except that 3 g of boric acid were dissolved in the sodium aluminate solution.

The product was zeolite Nu-13 containing 0.2% boron.

EXAMPLE 9

This Example was a repeat of Example 1 except that 5.8 g Chrome aliem and an extra 1.4 g of sodium hydroxide were dissolved in the sodium aluminate solution.

The product in this Example was zeolite Nu-13 containing about 5% w α-cristobalite and a trace of ferrierite. The product contained 0.3% w chromium.

What we claim is:

1. A synthetic zeolite material having a molar composition expressed by the formula:

0 to $4M_2O$:0.1 to $2.5Y_2O_3$:100$XO_2$:0 to $35H_2O$ where M is sodium, ammonium or hydrogen, Y is one or more of aluminium, gallium, boron, iron, chromium, vanadium, molybdenum, arsenic, antimony and manganese, X is silicon and/or germanium and $H_2O$ is water of hydration additional to water notionally present when M is hydrogen and having an X-ray diffraction pattern as set out in Table 1.

2. A synthetic zeolite material according to claim 1 having a molar composition expressed by the formula:

0 to $4M_2O$:0.5 to $1.7Y_2O_3$:100$XO_2$:0 to $35H_2O$.

3. A method of making synthetic zeolite material as defined in claim 1 which comprises reacting on aqueous mixture comprising at least one oxide $XO_2$, at least one oxide $Y_2O_3$ and at least one piperazine compound wherein the aqueous mixture has the molar composition:

$XO_2/Y_2O_3$: 40 to 1000
$MOH/XO_2$: $10^{-3}$ to 0.4
$Q/XO_2$: 0.01 to 5
$H_2O/XO_2$: 10 to 100
$MZ/XO_2$: 0.1 to 10 wherein X and Y have the meanings given in claim 1, Q is a piperazine compound, M in MOH is sodium or ammonium, M in MZ is sodium, ammonium or hydrogen and Z is a strong acid radical.

4. A method according to claim 3 wherein $XO_2/Y_2O_3$ is in the range 70 to 200.

5. A method according to claim 3 wherein $MOH/XO_2$ is in the range 0.02 to 0.15.

6. A method according to claim 3 wherein $Q/XO_2$ is in the range 0.05 to 2.

7. A method according to claim 3 wherein $H_2O/XO_2$ is in the range 25 to 50.

8. A method according to claim 3 wherein $MZ/XO_2$ is in the range of 0.3 to 3.

9. A method according to claim 3 wherein the piperazine compound is piperazine.

10. A catalyst comprising a synthetic zeolite material as claimed in claim 1.

11. A synthetic zeolite material having a molar composition expressed by the formula:

$$0 \text{ to } 4M_2O : 0.1 \text{ to } 2.5Y_2O_3 : 100XO_2 : 0 \text{ to } 35H_2O$$

wherein M is sodium, ammonium or hydrogen, Y is one or more of aluminium, gallium, boron, iron, chromium, vanadium, molybdenum, arsenic, antimony and manganese, X is silicon and/or germanium and $H_2O$ is water of hydration additional to water notionally present when M is hydrogen and having a X-ray diffraction pattern as set out in Table 2.

12. A method of making a synthetic zeolite material as defined in claim 11 which comprises reacting an aqueous mixture comprising at least one oxide $XO_2$, at least one oxide $XO_2$, at least one oxide $Y_2O_3$ and at least one piperazine compound wherein in the aqueous mixture has the molar composition:

$XO_2/Y_2O_3$: 40 to 100
$MOH/XO_3$: $10^{-3}$ to 0.4
$Q/XO_2$: 0.01 to 5
$H_2O/XO_2$: 10 to 100
$MZ/XO_2$: 0.1 to 10 wherein X and Y have the meanings given in claim 12, Q is a piperazine compound, M in MOH is sodium or ammonium, M in MZ is sodium, ammonium or hydrogen and Z is a strong acid radical.

* * * * *